(12) United States Patent
Gallo et al.

(10) Patent No.: US 6,907,469 B1
(45) Date of Patent: Jun. 14, 2005

(54) METHOD FOR BRIDGING AND ROUTING DATA FRAMES VIA A NETWORK SWITCH COMPRISING A SPECIAL GUIDED TREE HANDLER PROCESSOR

(75) Inventors: Anthony Matteo Gallo, Apex, NC (US); Natarajan Vaidhyanathan, Durham, NC (US); Gail Irene Woodland, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,981

(22) Filed: Apr. 11, 2000

(51) Int. Cl.[7] .................... G06F 15/173; H04L 12/28
(52) U.S. Cl. ................ 709/238; 370/392; 370/395.31; 370/401
(58) Field of Search .................. 709/238, 241–244; 370/351–357, 360, 389, 392, 401, 395.31, 381–382, 395.52, 254, 218, 236, 237, 238; 712/408; 379/220.01, 220, 272, 9; 710/316, 317; 713/153, 154; 455/445, 560

(56) References Cited

U.S. PATENT DOCUMENTS

| | | | | |
|---|---|---|---|---|
| 5,088,090 A | * | 2/1992 | Yacoby | 370/85.13 |
| 5,452,292 A | * | 9/1995 | Okanoue et al. | 370/54 |
| 5,909,686 A | * | 6/1999 | Muller et al. | 707/104 |
| 5,917,820 A | * | 6/1999 | Rekhter | 370/392 |
| 6,023,563 A | * | 2/2000 | Shani | 709/249 |
| 6,101,188 A | * | 8/2000 | Sekine et al. | 370/401 |
| 6,343,322 B2 | * | 1/2002 | Nagami et al. | 709/227 |

* cited by examiner

Primary Examiner—Beatriz Prieto
(74) Attorney, Agent, or Firm—Connolly Bove Lodge & Hutz LLP

(57) ABSTRACT

Certain Layer 3 protocol data frames propagated on a network are typically processed by a control point (CP) in a network switch. The logical bridging and routing functions required in this processing typically entail network device address look-ups in routing tables and address databases. Using the CP to perform these look-ups is expensive in terms of processor cycles and memory. To offload the CP, the bridging functions are performed a network processor in the switch. The network processor has specialized software and hardware enabling it to perform the required database look-ups faster and more efficiently than the CP.

16 Claims, 5 Drawing Sheets

METHOD FOR BRIDGING AND ROUTING DATA FRAMES VIA A NETWORK SWITCH COMPRISING A SPECIAL GUIDED TREE HANDLER PROCESSOR

CROSS REFERENCE TO RELATED APPLICATIONS

This application is related by common inventorship and subject matter to co-pending application titled "Local MAC address Learning in Layer 2 Frame Forwarding", U.S. application Ser. No. 09/547,369 filed Apr. 11, 2000. This application is assigned to International Business Machines Corporation and is entirely incorporated herein by this reference.

BACKGROUND OF THE INVENTION

The present invention relates to the processing of data frames being transferred through a network, and more particularly to a method for using a network processor to perform network bridging functions for data frames destined for or originating from a control point in the network.

In computer networks data is typically communicated between network devices in "frames". In addition to user data, each frame typically includes fields containing information for routing the frame through the network. The fields are used by a system of established protocols which may be thought of as being arranged in a "protocol stack" referred to as the Open Systems Interconnect (OSI) model. At the base of the stack is a Layer 1 (L1) which is the protocol relating to the physical transmission media of the network.

Above L1 is a Layer 2 (L2) used in Ethernet and Token Ring local area networks (LANs). The L2 level correlates unique media access control (MAC) addresses for network devices with physical ports.

A network switch may connect multiple virtual LANs (VLANs) and process frames for transfer within a VLAN or between VLANs. The L2 protocol is used for frame transfers within a VLAN. Operations by the switch at the L2 level are typically referred to as "bridging". For communication between different VLANs, a Layer 3 (L3) protocol is needed. Operations by a network switch at the L3 level are typically referred to as "routing".

In existing systems, a network switch 100 typically has the configuration shown in FIG. 1. A control point (CP) 101 in the switch comprises a general purpose processor and software including a logical router 102 for L3 operations and a logical bridge 104 for L2 operations. The logical router comprises a routing table 103 and the logical bridge comprises a MAC address database 105 correlating MAC addresses with physical ports. Multiple network processors (NPs) 106 (only one is shown) on the switch include a plurality of ports 107 for receiving and outputting data frames 108. Network processors such as 106 include specialized software and hardware which enable them to perform fast database look-ups for frame forwarding.

In existing systems, certain L3 frames propagated on a network are typically processed by the CP. Examples include ARP (Address Resolution Protocol) and OSPF (Open Shortest Path First) frames. In addition, applications running on the CP itself may generate frames destined for other CPs. For example, control protocols for setting up forwarding tables in the NPs run from CP to CP. Also; CPs may generate and/or receive SNMP (Simple Network Management Protocol) queries.

When an incoming frame 108 is sent to the CP or the CP generates a frame, the L3 software in the logical router 102 is executed to perform a look-up in the routing table 103 to determine a logical router interface corresponding to a destination MAC address in the frame. Then, L2 processing by the logical bridge 105 uses the logical router interface and the destination MAC address to look up the MAC address and port corresponding to the L3 destination address in the MAC address table 105, so that the frame can be forwarded to the appropriate target network device. Also, MAC address "learning" is performed by the logical bridge in the CP, which adds MAC addresses and ports to the MAC database to facilitate frame forwarding.

As noted above, the CP typically utilizes a general purpose processor. The processor typically executes a high-level code, such as "C". Accordingly, the database look-ups entailed in the foregoing are relatively slow and consume a significant proportion of CP processing cycles. Further, memory in the CP must be allocated for the MAC address database used by the logical bridge.

In view of the above, an improved method of handling frames destined for or originating from the CP is needed.

SUMMARY OF THE INVENTION

According to the present invention, the logical bridging function for frames destined for or originating from the CP is offloaded from the CP to a network processor. In a preferred embodiment, frames destined for or originating from the CP are sent to a network processor directly connected to the CP. The network processor performs all the L2 level bridging operations needed by the CP, including MAC address learning for incoming frames, and destination address look-ups and frame forwarding for frames originating from the CP.

Because, as noted above, network processors include special-purpose software and hardware, they are able to perform the database look-ups and learning entailed in L2 processing at a substantially greater rate than the general-purpose CP, providing higher throughput. Further, processing cycles and memory demands are offloaded from the CP, enabling it to be used for other functions.

DETAILED DESCRIPTION OF THE INVENTION

Figure 1:
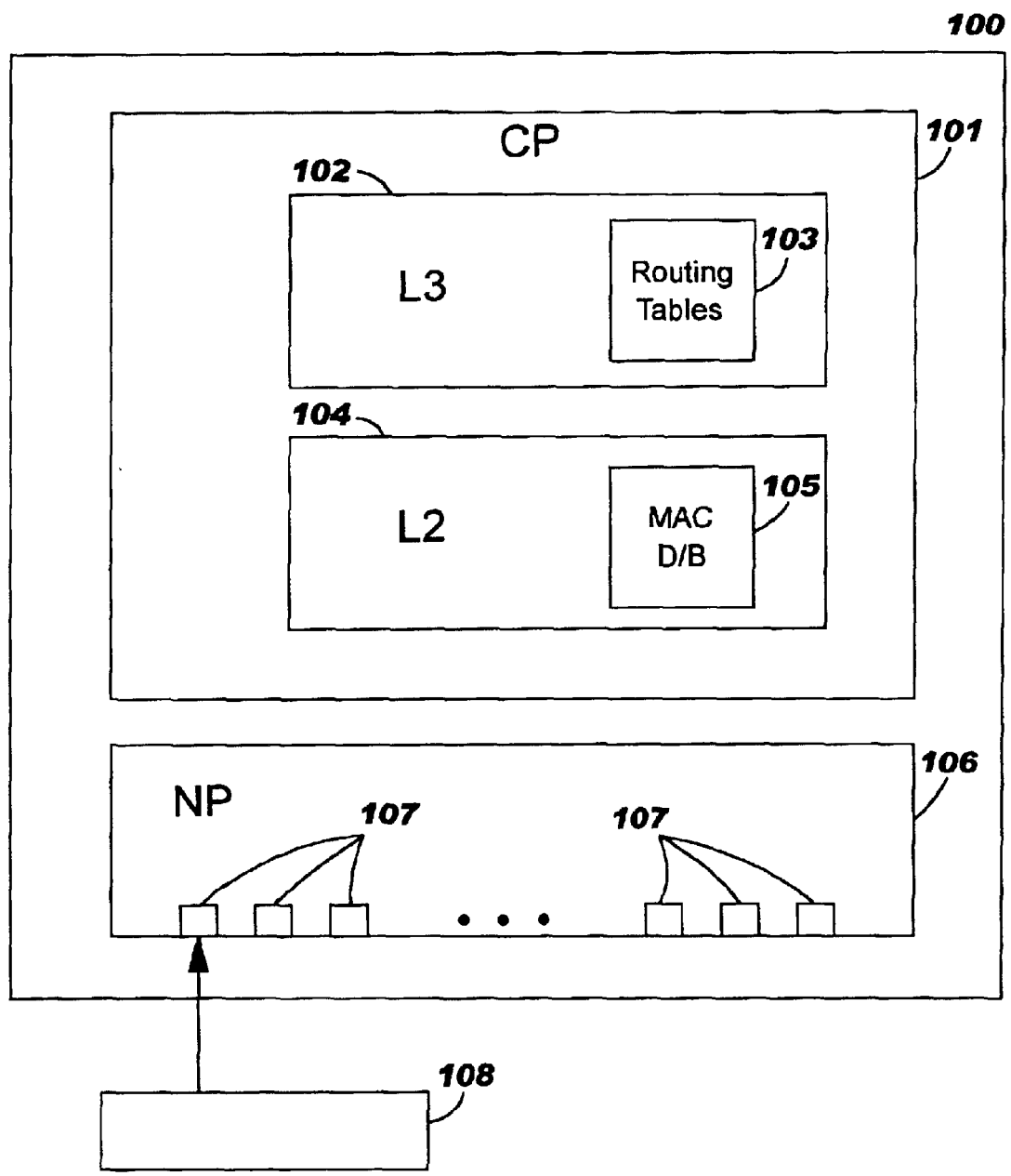
FIG. 1 shows an example of a prior art network switch configuration.
Figure 2:
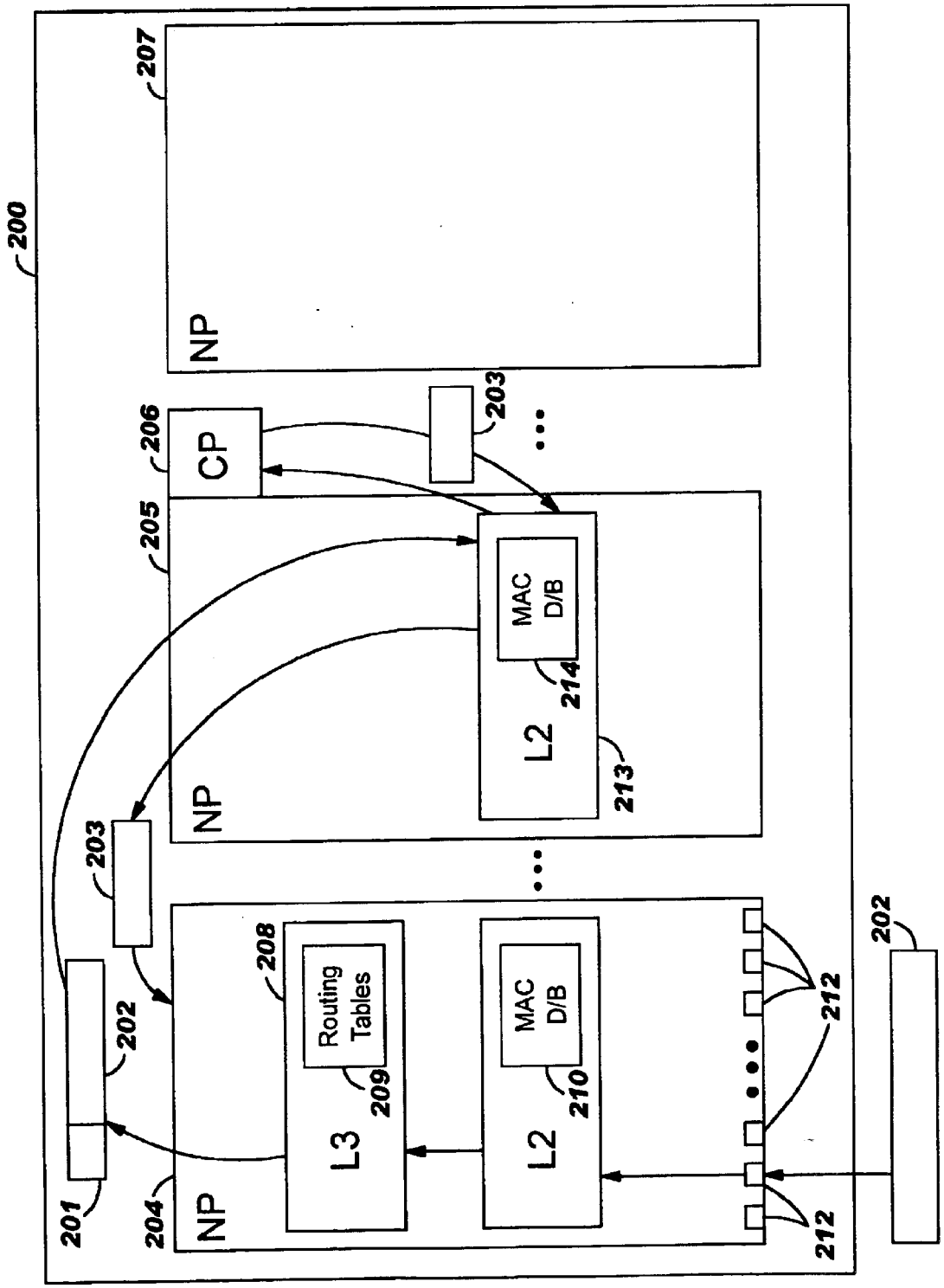
FIG. 2 shows an example of a network switch according to the present invention.

FIG. 2 shows a network switch 200 configured according to the present invention. The switch comprises a plurality (not limited to three) of network processors 204, 205 and 207. A CP 206 (the switch is not limited to having a single CP) is directly connected to NP 205. The CP typically executes control protocols and downloads forwarding tables in the NPs. Where in prior art switch configurations, a logical bridge 213 was in the CP as shown in FIG. 1, in the present invention the logical bridge 213 is in the NP 205. The logical bridge comprises computer-executable instructions which when executed by hardware in the NP implement L2 data frame processing according to the present invention. The hardware in the NP includes a plurality of forwarding processors which can perform fast database look-ups, and a specialized processor known as a Guided Tree Handler which manages the MAC address database 214.

Network data frames such as frame 202 enter the switch from a physical medium through a plurality of ports 212 in the NPs. Next, in most switches, L2 processing of the frame is performed by a logical bridge such as 210. L2 processing typically comprises a look-up for the destination address (DA) in the frame in the MAC address database 210, to determine whether to filter, flood, or forward the frame. Filtering refers to dropping or discarding a received data frame when processing of the MAC address.

MAC address learning, as noted above, refers to a known process for facilitating frame forwarding, wherein the source MAC address in a received frame is recorded in a MAC address database such as 210 and 214, along with its port of origin. This allows future frames destined for the source address (SA) to be forwarded only to the port on which that address is located. Otherwise, an unrecognized address must be flooded.

The look-up on the DA in the frame will also determine whether the frame needs L3 processing by the logical router 208. A status bit the MAC address database in the entry will indicate that if the frame is destined for a particular MAC address, it is L3 traffic.

If the frame needs L3 processing it is sent to the logical router 208. The logical router comprises computer-executable instructions which when executed by hardware in the NP implement L3 data frame processing according to the present invention. If the frame needs to go to the CP 206, this is indicated by a look-up in the routing tables 209. It is noted that not every L3 frame needs to be sent to the CP; some are sent directly to other NPs. If a frame is destined for the CP, the logical router 208 sets a status bit so indicating in a frame header 201 appended to the frame.

According to the present invention, the frame is then sent to the NP 205 directly connected to the CP 206, via hardware connections known as "switch fabric". When a frame is sent from one NP to another through the switch fabric, the target NP is said to perform "downside" processing of the frame.

In downside processing according to the present invention, L2 processing is performed by the logical bridge 213 in the NP 205. The L2 processing includes MAC address learning. To do the learning, a look-up is performed in the MAC address database 214 for the SA in the frame 202. If it is not found, the SA and its port of origin are added to the MAC address database.

Subsequently, the frame is sent to the CP 206. Typically, the CP 206 will generate a response frame 203; usually the DA MAC address will be the SA of the incoming frame. The response frame is sent back to the logical bridge 213, which typically will have just learned the SA, and so the response frame can be forwarded via the switch fabric directly to the target port (usually in the NP where the original frame 202 entered). If the CP originates the frame 203 or the SA has aged out of the MAC database 214, the frame is flooded.

Figure 3:
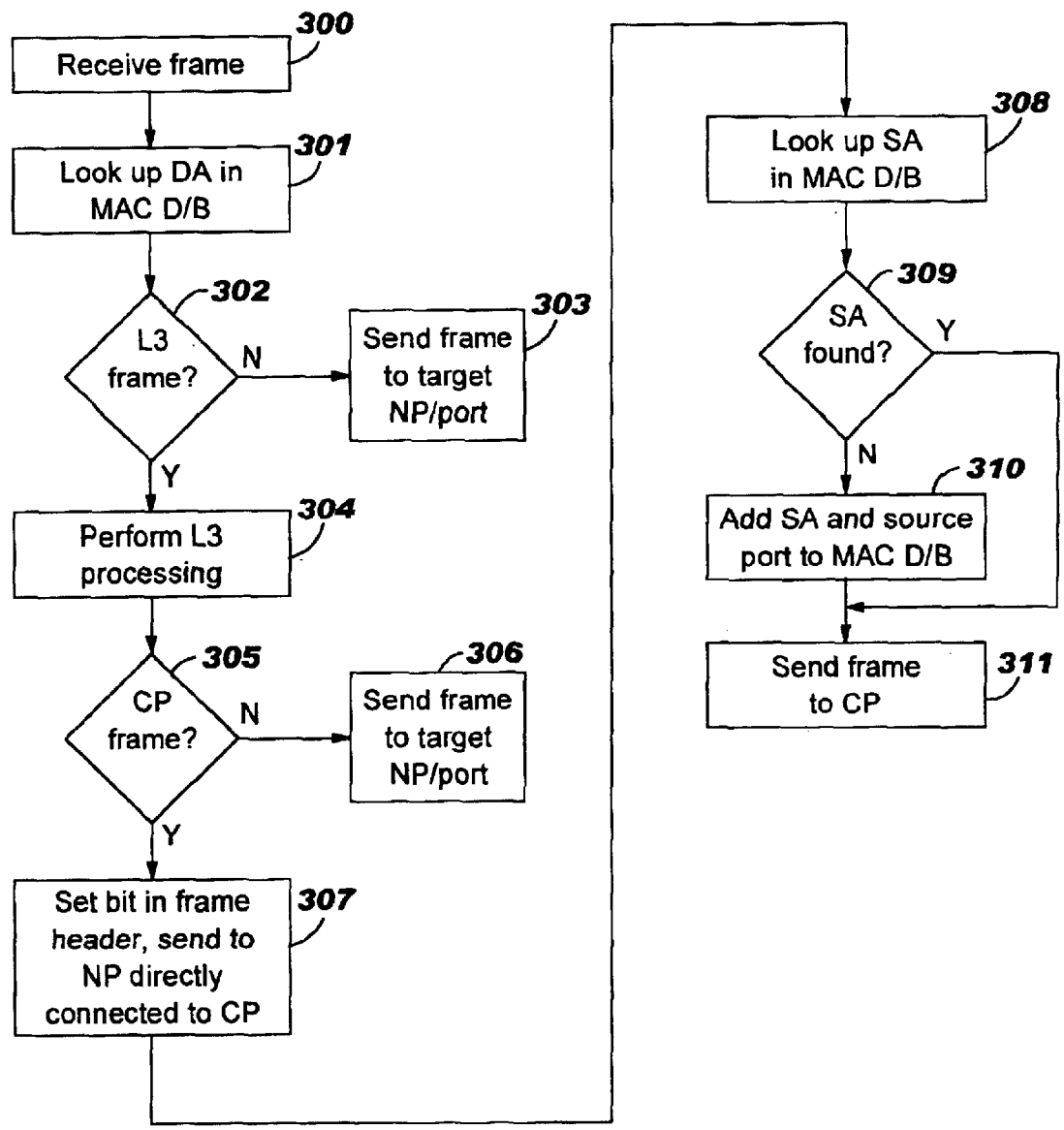
FIG. 3 shows a processing flow for a frame destined for the CP.

FIG. 3 illustrates a processing flow for an incoming frame according to the present invention in flowchart form. When a frame is received, a DA look-up is performed by the logical bridge in the receiving NP, as shown in blocks 300 and 301. If the look-up determines that the frame is an L3 frame, the frame is sent to the logical router as shown in blocks 302 and 304. Otherwise, the frame is forwarded or flooded to the target NP and port, as shown in block 303.

The logical router does L3 processing, performing a look-up in the routing tables to determine whether the frame needs to go to the CP, as shown in blocks 304 and 305. If not, the frame is sent to the target NP/port (block 306).

If the frame needs to go to the CP, a status bit indicating this is set in a frame header appended to the frame, and the frame is sent for downside processing to the NP directly connected to the CP as shown in block 307.

The logical bridge in the NP performs L2 processing of the frame, including MAC address learning. As shown in blocks 308–311, to do the learning, the SA in the frame is looked up in the local MAC address table. If it is already present, the frame is sent to its destination, the CP. If not, the SA and its port of origin is added to the MAC address database, and the frame is sent to the CP.

Figure 4:
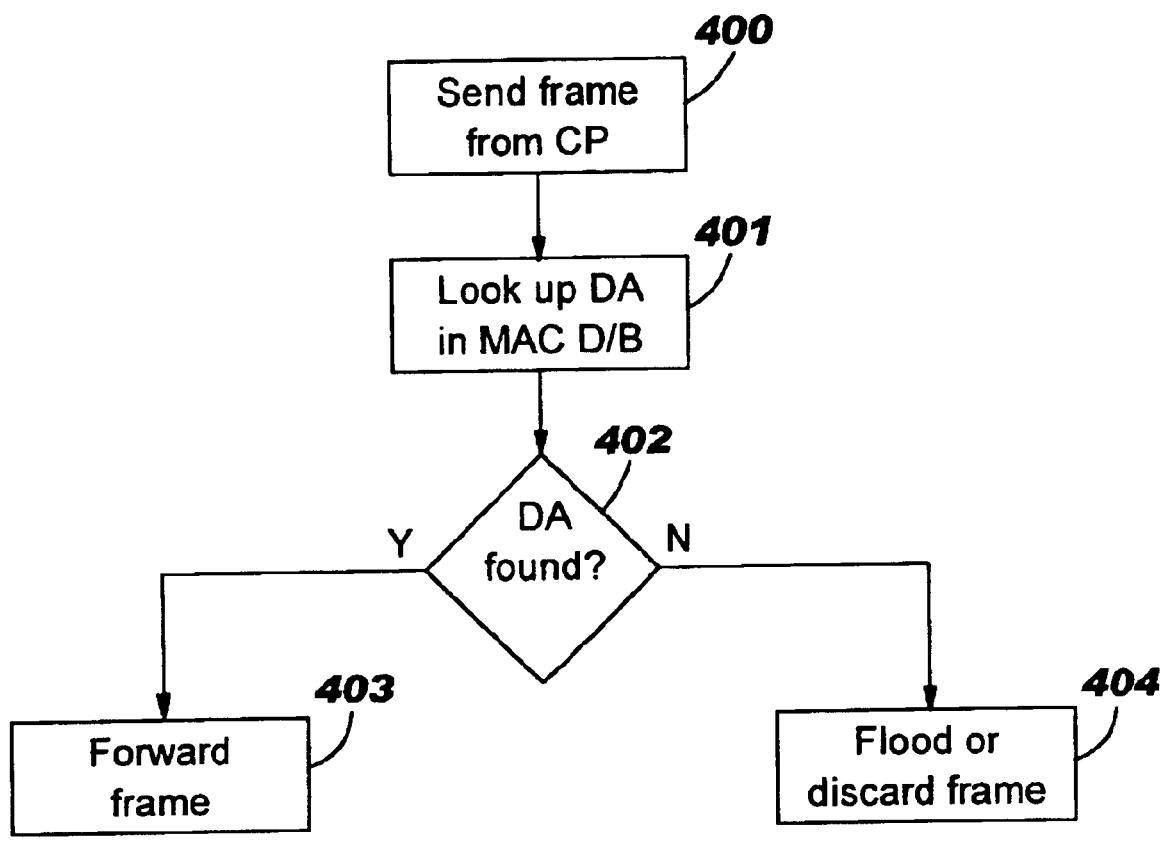
FIG. 4 shows a processing flow for a response frame or frame originating from the CP.

FIG. 4 shows a flow for a response frame or frame originating from the CP. The frame is sent from the CP to the logical bridge, which performs a look up in the MAC address table for the DA, as shown in blocks 400 and 401. Typically, the DA will have been recently learned, and the frame will be forward to the target NP/port, as shown in blocks 402 and 403. Otherwise, the frame will be flooded or discarded (block 404).

It may be appreciated from the foregoing that the present invention frees up a significant proportion of CP processor cycles and memory that would otherwise have been used for logical bridging functions, allowing the CP to be used for other work. Additionally, the database look-ups necessitated by bridging are performed significantly faster, by the specialized hardware and software of the NPs.

Figure 5:
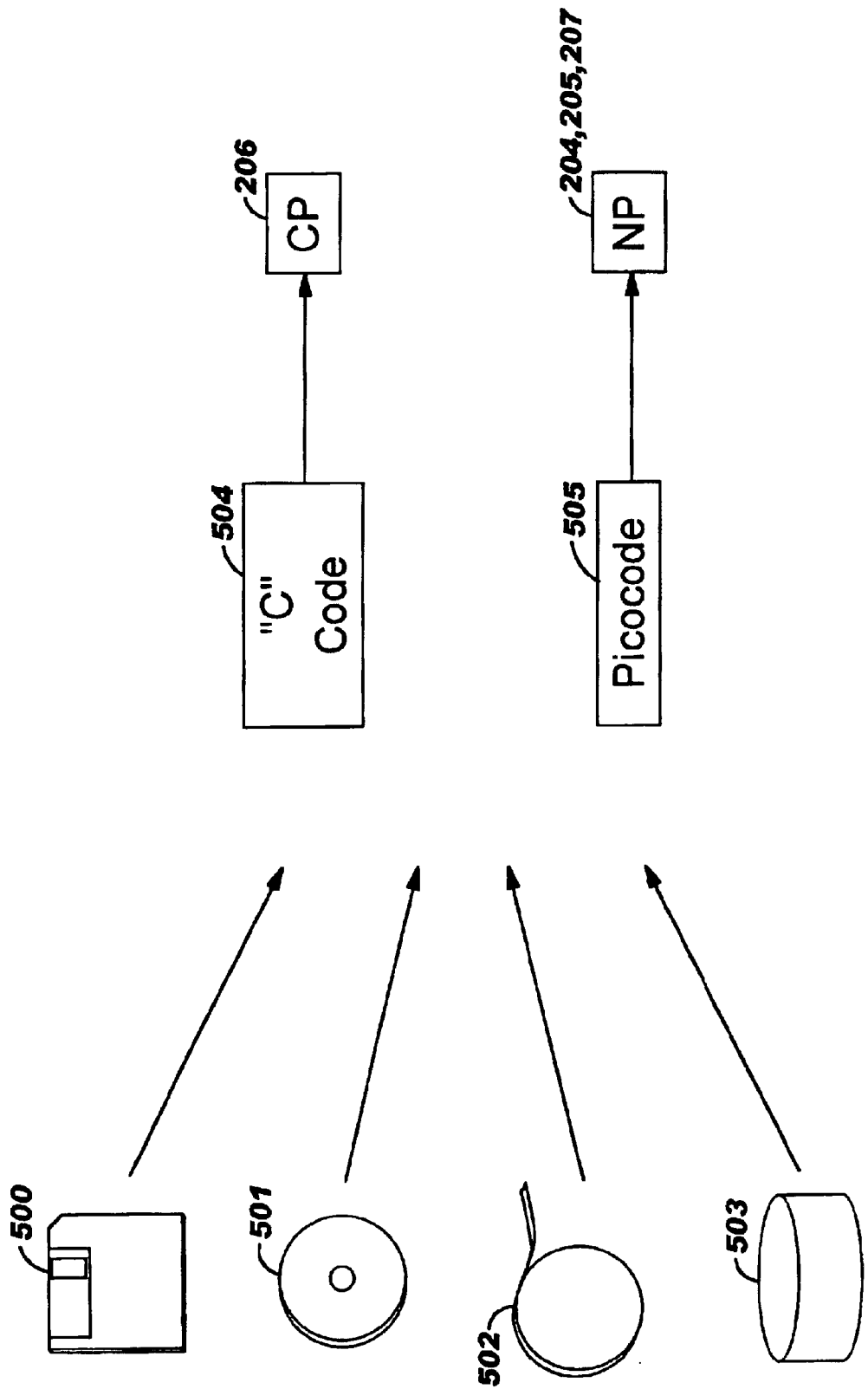
FIG. 5 shows examples of computer-usable storage media for storing computer-executable instructions according to the present invention.

As noted above, in a preferred embodiment the invention is implemented as a configuration of specialized software comprising computer-executable instructions in a network switch. As shown in FIG. 5, software executed by the NPs is typically known as "picocode" 505, executable by specialized processors as detailed above. The CP 206 is typically a general purpose processor that executes a high-level code 504 such as "C" language code. The picocode 505 and CP code 504 may be stored and transported on computer-usable media such as diskette 500, CD-ROM 501, magnetic tape 502 or fixed disk 503. In a well-known fashion, the code may retrieved from the computer-usable media, loaded into a memory on the switch and executed to effect the features of the invention.

The foregoing description of the invention illustrates and describes the present invention. Additionally, the disclosure shows and describes only the preferred embodiments of the invention, but it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. In a network switch comprising a control point and a plurality of network processors, a method comprising:

(a) receiving data frames from a network; and (b) performing logical bridging of data frames destined for or originating from said control point in a network processor directly connected to said control point, managing a media access control (MAC) address database with a Guided Tree Handler, and sending data frames to a logical router in another network processor with an (Layer 3) L3 table for all (Layer 3) L3 processing, wherein said network processor directly connected to said control point further comprising a logical bridge and the MAC address database and said network processor directly connected to said control point is free of an L3 table.

2. The method of claim 1, said step (b) comprising:

(c) determining whether said data frame is destined for said control point; and (d) sending said data frame to said network processor directly connected to said control point when said step (c) indicates that said data frame is destined for said control point.

3. The method of claim 2, said step (c) comprising:

(e) looking up a destination address in said frame in a media access control (MAC) address database;

(f) sending said data frame to a logical router when said look-up determines that said data frame requires processing by a logical router;

(g) looking up a destination address in a routing table in said logical router; and (h) sending said frame to said network processor directly connected to said control point when said look-up determines that said frame is destined for said control point.

4. The method of claim 3, further comprising:

setting a bit in a frame header appended to said frame to indicate that said frame is destined for said control point.

5. The method of claim 1, said step (b) comprising:

learning a source MAC address in said frame in a MAC address database; and sending said frame to said control point.

6. The method of claim 1, said step (b) comprising:

looking up a destination address in a frame originating from said control point in a MAC address database; and forwarding said frame to a target network processor and port found in said look-up.

7. A network switch comprising:

a control point;

a plurality of network processors;

said plurality of network processors programmed with logical bridging and logical routing functions;

wherein a network processor directly connected to said control point performs logical bridging functions needed by said control point, said network processor further comprising a logical bridge and a media access control (MAC) address database, and wherein said network processor directly connected to said control point manages the MAC address database with a Guided Tree Handler, sends data frames to a logical router in another network processor with and (Layer 3) L3 table for all (Layer 3) L3 processing, and is free of an L3 table.

8. The network switch of claim 7, wherein said logical bridging and logical routing functions determine that an incoming data frame to one of said plurality of networks processors is destined for said control point and send said data frame to said network processor directly connected to said control point.

9. The network switch of claim 8, wherein said logical bridging function in said network processor directly connected to said control point learns a source address in said frame in a MAC address database.

10. The network switch of claim 9, wherein said logical bridging function in said network processor directly connected to said control point receives a frame originating from said control point, looks up said learned source address, and forwards said frame originating from said control point to a target network processor corresponding to said learned source address.

11. A computer-usable medium storing computer executable instructions, said instructions when executed by processors in a network switch comprising a control point and a plurality of network processors, implementing a method comprising:

(a) receiving data frames from a network; and (b) performing logical bridging of data frames destined for or originating from said control point in a network processor directly connected to said control point, managing a media access control (MAC) address database with a Guided Tree Handler, and sending data frames to a logical router in another network processor with an (Layer 3) L3 table for all (Layer 3) L3 processing, wherein said network processor directly connected to said control point further comprising a logical bridge and the MAC address database, and said network processor directly connected to said control point is free of an L3 table.

12. The computer-usable medium of claim 11, said step (b) 2 comprising:

(c) determining whether said data frame is destined for said control point; and (d) sending said data frame to said network processor directly con nected to said control point when said step (c) indicates that said data frame is destined for said control point.

13. The computer-usable medium of claim 12, said step (c) comprising:

(e) looking up destination address in said frame in a media access control (MAC) address database;

(f) sending said data frame to a logical router when said look-up determines that said data frame requires processing by a logical router;

(g) looking up a destination address in a routing table in said logical router, and (h) sending said frame to said network processor directly connected to said control point when said look-up determines that said frame is destined for said control point.

14. The computer-usable medium of claim 13, said method further comprising:

setting a bit in a frame header appended to said frame to indicate that said frame is destined for said control point.

15. The computer-usable medium of claim 11, said step (b) comprising:

learning a source MAC address in said frame in a MAC address database; and sending said frame to said control point.

16. The computer-usable medium of claim 11, said step (b) comprising:

looking up a destination address in a frame originating from said control point in a MAC address database; and forwarding said frame to a target network processor and port found in said look-up.

\* \* \* \* \*